(12) United States Patent
Flynn

(10) Patent No.: US 7,727,400 B2
(45) Date of Patent: Jun. 1, 2010

(54) LOW WATER RECOVERY RATE DESALINATION SYSTEM AND METHOD

(76) Inventor: Michael Flynn, 516 Oakdale Ave., Corte Madera, CA (US) 94035

(*) Notice: Subject to any disclaimer, the term of this patent is extended or adjusted under 35 U.S.C. 154(b) by 601 days.

(21) Appl. No.: 11/234,604

(22) Filed: Sep. 23, 2005

(65) Prior Publication Data

US 2007/0068871 A1    Mar. 29, 2007

(51) Int. Cl.
B01D 61/00    (2006.01)
B01D 63/00    (2006.01)

(52) U.S. Cl. .................. 210/652; 210/644; 210/638; 210/195.2; 210/257.2

(58) Field of Classification Search .............. 210/644, 210/652, 180, 195.2, 257.2, 638
See application file for complete search history.

(56) References Cited

U.S. PATENT DOCUMENTS

| 3,423,491 | A | | 1/1969 | McLain | 264/49 |
|---|---|---|---|---|---|
| 3,463,730 | A | | 8/1969 | Booth et al. | 210/58 |
| 3,670,897 | A | * | 6/1972 | Frank | 210/321.6 |
| 3,721,621 | A | * | 3/1973 | Hough | 210/638 |
| 3,906,250 | A | * | 9/1975 | Loeb | 290/1 R |
| 4,177,146 | A | * | 12/1979 | Popper et al. | 210/137 |
| 4,781,837 | A | * | 11/1988 | Lefebvre | 210/640 |
| 4,787,982 | A | | 11/1988 | Caro et al. | 210/641 |
| 5,098,575 | A | * | 3/1992 | Yaeli | 210/652 |
| 5,108,611 | A | * | 4/1992 | Chen et al. | 210/637 |
| 5,382,365 | A | * | 1/1995 | Deblay | 210/644 |
| 5,496,466 | A | | 3/1996 | Gray et al. | 210/137 |
| 6,656,361 | B1 | * | 12/2003 | Herron et al. | 210/640 |
| 6,656,362 | B1 | | 12/2003 | Kihara et al. | 210/652 |
| 6,709,599 | B1 | | 3/2004 | Rosenberger et al. | 210/652 |
| 7,445,712 | B2 | * | 11/2008 | Herron | 210/500.29 |
| 2005/0145568 | A1 | | 7/2005 | Mc Ginnis | 210/639 |

* cited by examiner

Primary Examiner—Ana M Fortuna

(57) ABSTRACT

A low water recovery rate desalination system and method. This system and method enables the purification of water in a more environmentally sustainable manner than conventional systems. The environmental benefit of this invention is derived from its ability to desalinate water and produce a brine byproduct that is less concentrated than that of conventional desalination systems. The system is composed of three elements. They are a water makeup element, a concentration element and a desalination system. The water makeup element and the concentration element can integrated with a conventional desalination technology to form a complete desalination system.

19 Claims, 4 Drawing Sheets

US 7,727,400 B2

LOW WATER RECOVERY RATE DESALINATION SYSTEM AND METHOD

BACKGROUND

1. Field of the Invention

The present invention is related to the production of desalinated water from seawater or other sources of water contaminated with saline. More particularly, the present disclosure relates to a system of producing desalinated water from a saline contaminated water source through a low water recovery desalination system

2. Related Art

Desalination systems are desirable in many arid regions and in marine applications where fresh water supplies are limited but large amounts of seawater, inland waterways, rivers, or other sources of salt containing water are available.

Conventional desalination systems utilize reverse osmosis or distillation processes. Both of these processes typically result in recovery ratios of approximately 50%. Thus for every gallon of water taken in as feed ½ of a gallon will become purified product water and the other ½ gallon will be discharged with a brine content approximately double in concentration of the feed water's concentration. Discharge of this concentrated brine to the environment can produce localized negative impacts. Reverse osmosis and distillation processes operate at high recovery ratios in order to reduce specific power consumption. This is required because in conventional systems all of the feed is either heated, as in the case of distillation, or pressurized as in the case with reverse osmosis.

The maximum recovery rate conventional systems can operate at is usually limited by the tendency of the feed waters to form scaling deposits. Scale forming compounds, such as calcium and silica, can precipitate on the membranes or heat transfer surfaces of the primary desalination system. This can result in costly equipment replacements or cleaning. The tendency to form scale is a function of the maximum concentration of scale forming materials in the concentrated brine, which is in turn determined by the feed concentrations of these solutes and the system water recovery ratio. Due to composition, this typically limits the recovery ratio in most seawater desalination applications to about 50%.

Additionally, due to the need to operate at high recovery rates, feed pretreatment is usually required. Existing pretreatment methods produce solid wastes that are usually disposed of in landfills and may contain hazardous contaminates such as heavy metals. Conventional desalination systems also kill most organisms entrained in the feed and produce a brine byproduct that is high in salts and toxic to most organisms.

Although conventional desalination systems exist, there are no systems available which efficiently operate at water recovery rates low enough to produce a brine that is environmentally benign. There is also a need for systems which do not produce solid wastes and which reduces or eliminates the kill rate of entrained marine organisms in the feed water.

What is needed is a low water recovery rate desalination system that reduces the negative environmental impacts of desalination.

DETAILED DESCRIPTION OF THE DRAWINGS

Figure 1:
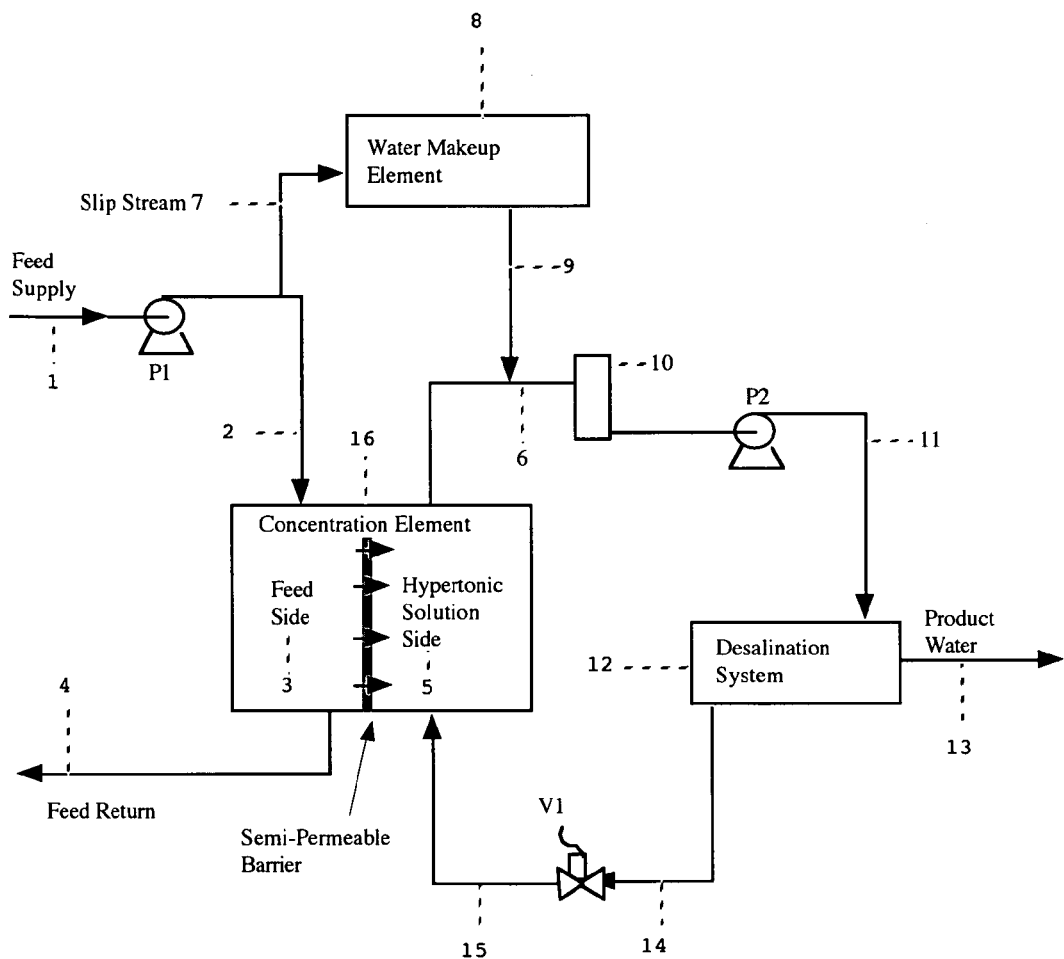
FIG. 1 depicts one embodiment of a low water recovery rate desalination system.
Figure 2:
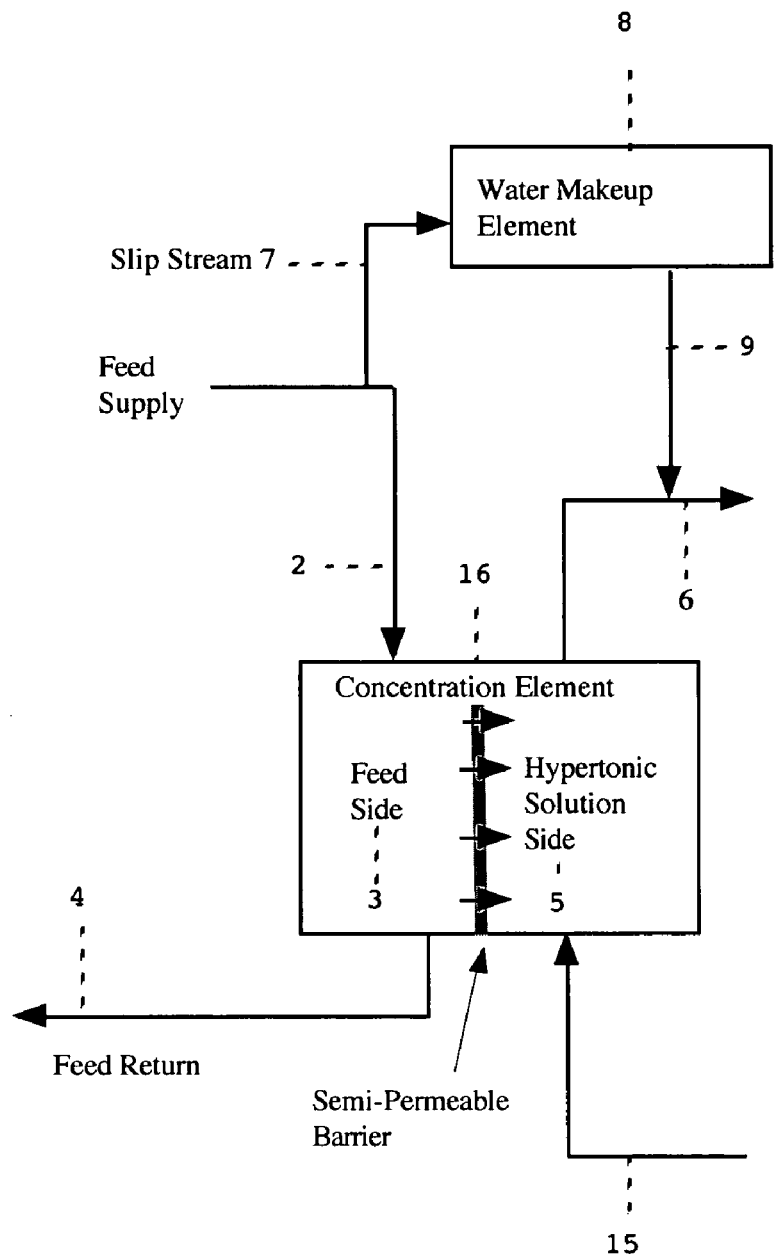
FIG. 2 depicts the Innovative portion of the embodiment shown in FIG. 1

FIG. 1 shows a low water recovery rate desalination system and illustrates the combination of a concentration element (16) and a water makeup element (8) as a pretreatment system for a conventional desalination system (12).

Concentration Element (16)

The function of this element is based on the naturally occurring diffusion of water across a permeable barrier from a contaminated water source, such as seawater, to a more concentrated intermediary fluid called a hypertonic solution. A hypertonic solution can be composed of concentrated feed and its solute composition is the same as that in the feed. However, in a hypertonic solution, contamination components have been concentrated to a level higher than the feed. Additionally, in the hypertonic solution, any solutes that may foul or scale the desalination element can be removed or in some cases addressed by the introduction of anti-scale chemicals. In some embodiments, a semi-permeable barrier can separate the feed (3) and the hypertonic solution (5). In such an embodiment, water flows from the feed into the hypertonic solution across the barrier according to water concentration gradients from the feed to the hypertonic solution. Thus, the feed water can be concentrated and the hypertonic solution can be diluted.

In the concentration element a hypertonic solution can be re-circulated on the permeate side of a semi-permeable barrier and a lower concentration feed can be circulated through the wastewater side. Both the hypertonic solution and the feed can be composed of the same solutes and solvents. The only difference between the feed and hypertonic solution is that the hypertonic solution can be maintained at a higher concentration and can have been pre-treated to reduce scaling and fouling potential.

Since the solutes in the hypertonic solution are the same as that in the feed and the semi-permeable barrier can be slightly permeable to the solutes, there can be a reverse flux of salts from the hypertonic solution back into the feed. The driving force for this flow can be saline concentration gradients in the opposite direction as the product water. A feed water makeup element can be used to makeup these solutes that are lost from the hypertonic solution. In some embodiments, the feed water makeup element can pretreat a portion of the feed and mix it directly with the hypertonic solution at the outlet of the concentration module element.

The hypertonic solution can then be re-concentrated in a conventional desalination system such as distillation, electrodialysis or other systems and then recycled back into the concentration module. The water produced in the re-concentration process can be the product water of the low water recovery rate desalination system. The water recovery rate of the desalination element and the membrane surface area in the concentration module element can be used to adjust the total system water recovery rate.

Figure 4:
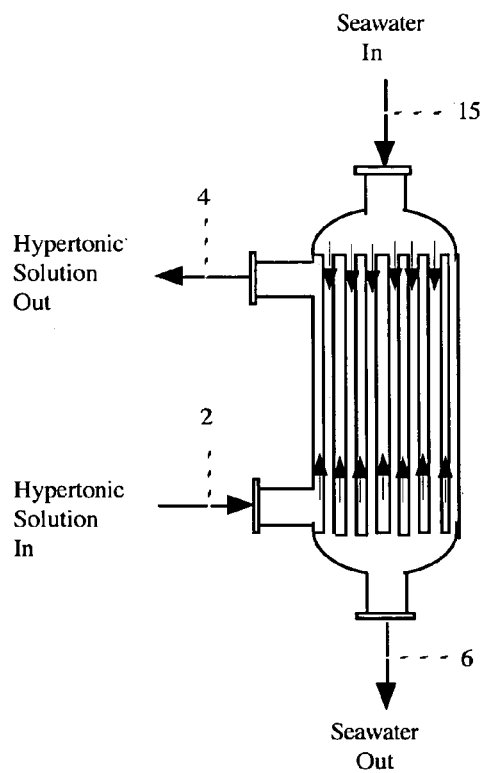
FIG. 4 depicts the concentration element of the embodiment shown in FIG. 1.

In some embodiments, the concentration module can be constructed of flat sheets, hollow fibers, or spiral wound sheets of conventional hydrophilic asymmetric membranes or other semi-permeable hydrophilic barriers. However, in alternate embodiments any known and/or convenient barrier in any convenient geometry can be used. A cross flow configuration can be used for flat sheet contactors and a counter current configuration can be used for hollow fiber and spiral wound contactors. FIG. 4 shows an example of a counter current hollow fiber configuration. In this configuration the feed (15) can be passed through the center of the hollow fibers and the hypertonic solution (2) can be passed across the outside of the fibers. In some embodiments the flow can be reversed.

Since the feed is not significantly concentrated in the embodiments described herein, the need to pre-treat the feed to control scaling and remove suspended solids is reduced or in some cases eliminated. As a result the kill rate of entrained marine organisms in the feed water is lower than that in conventional water desalination systems.

A barrier with high solute permeability and stability can be desirable. Good solute and organic rejection characteristics are also desirable, but not necessary. Chemical stability in the environment of operation can be important for heavily polluted or industrial waters.

Water Makeup Element (8)

Figure 3:
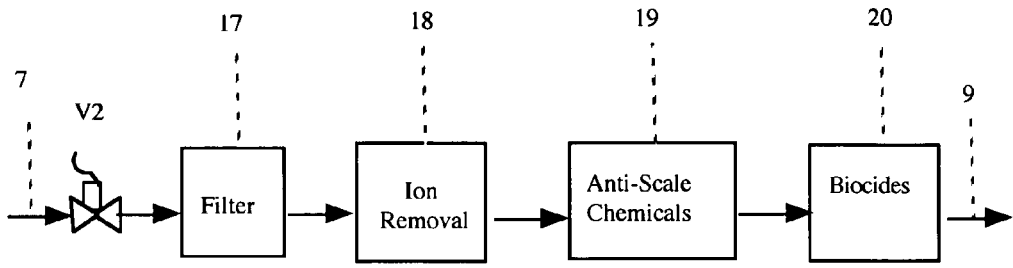
FIG. 3 depicts the water make up element of the embodiment shown in FIG. 1

FIG. 3 shows the integration of the filtration (17), ion removal (18), anti-scale chemical (19), and biocide modules (20) that makeup the element. In some embodiments, the water make up element can be configured with or without the biocide module.

Since the solutes in the hypertonic solution are the same as those in the feed, and can be at a higher concentrations, some amount of these solutes will diffuse from the higher concentration hypertonic solution back across the semi-permeable barrier into the feed. The rate of this solute diffusion can be modified by appropriate selection of a semi-permeable barrier. When a conventional hydrophilic asymmetric cellulose triacetate membrane can be used, this reverse diffusion results in about a 0.07% m (solutes/product water) loss of hypertonic solution solutes back into the feed.

In some embodiments a slipstream can be taken from the feed by a water makeup element (8) and can be used to make up for this loss. The make up feed water can be mixed with the hypertonic solution at the outlet to the concentration module element (16). In some embodiments, the makeup water can be filtered (17) and scale forming ions can be removed (18) prior to mixing it with the hypertonic solution. Anti-scale chemicals can also be used where complete removal of scale forming ions is not possible (19). By other means Biocides can also be added if microbial contamination is a concern or additional sterility of the product is desired (20).

In some embodiments Ion removal (18) can be performed using either ion exchange, for small applications, or warm lime precipitation, for large applications. Ion exchange is a reversible chemical reaction wherein an ion in solution can be exchanged for a similarly charged ion attached to an immobile solid particle. These solid ion exchange particles can be composed of organic resins or heavy-metal-selective chelating resins and are readily available.

In the lime-softening process hydrated lime can be added until the pH of the water being treated is raised sufficiently to precipitate calcium carbonate and, if necessary, magnesium hydroxide, and/or any other precipitate. Re-carbonation can be in some embodiments employed to reduce the pH back to neutral after the precipitation is complete.

In some embodiments, anti-scale chemicals (19) can be used to prevent the formation of calcium, magnesium, and iron scales. Anti Scale chemicals are most commonly composed of synthetic polymers and are readily available. These polymers contain a variety of functional groups along the polymer chain and are generally anionic in nature. Among the most commonly used are: poly (acrylic acid), PAA; poly (methacrylic acid), PMAA; poly (malic acid), PMA, and proprietary polymer-based formulated blends. Selection of the most appropriate chemicals can be dependant on feed water chemistry.

Desalination System (12)

In some embodiments, the hypertonic solution can be passed through a conventional desalination system such as distillation, electrodialysis, reverse osmosis, or other conventional or hybrid systems. In the desalination system the water can be separated from the hypertonic solution as pure water and the hypertonic solution can be reconcentrated. The reconcentrated hypertonic solution can then be passed back to the concentration module and the process can be repeated. This system can be implemented to operate with all types of commercially available desalination systems.

Process Flow Description

The flow of fluids through some embodiments is described as follows and as shown in FIG. 1.

Feed (1) enters the system through pump (P1). This pump operates at a low pressure selected to overcome head losses and maintain required flow velocities in the concentration module element. The flow rate can be selected to achieve a recovery ratio that minimizes the environmental impact associated with its discharge (4), achieves the desired permeation rate, maintains fluid velocities required to keep membranes clean, and minimizes pumping costs at (P1).

In the concentration element, the feed (2) can be passed across one side of a semi-permeable barrier on the feed side of the concentration element (3). On the other side of this barrier, on the permeate side of the concentration element (5), is a hypertonic solution. The hypertonic solution can be composed of feed water that has been concentrated to a level higher than the feed but lower than its solubility threshold. The concentration level of the hypertonic solution and the surface area of the semi-permeable barrier can be selected based on the desired recovery ratio and resulting feed flow rate.

In the concentration element, water diffuses along concentration gradients from the higher liquid content feed through the semi-permeable barrier and into the lower liquid content hypertonic solution (3 to 5). The feed (2) can therefore be concentrated and the hypertonic solution can be diluted (15).

Since the solutes in the feed and in the hypertonic solution are the same, leakage back across the membrane of solutes from the more concentrated hypertonic solution (5) into the less concentrated feed (3) occurs in opposition to the diffusion of water.

This lost solute can be made-up by diverting a constant flow of feed (7) back into the hypertonic solution (9). This replaces any solutes that leak back across the barrier into the feed. Before this water is mixed with the hypertonic solution, it can be pre-treated. This occurs in the water makeup element (8). The water makeup element is shown in FIG. 3. Since the feed water can be expected to have suspended solids and scale forming components it can be filtered (17) passed through a targeted ion removal system (18) prior to mixing with the hypertonic solution. In some cases anti-scale chemicals (19) and biocides (20) can also be used to treat the makeup water (9). The use of biocides provides the added benefit of insuring additional biological purity of the product water.

After mixing the feed makeup (9) with the hypertonic solution (6) it can be passed into a permeate holding tank (10). From this tank it can then be pumped by P2 via. (11) into the desalination system (12).

In the desalination system water can be removed from the hypertonic solution. This water becomes the product of the overall process (13). The hypertonic solution can be re-concentrated as a result of the removal of the product water. This reconstituted hypertonic solution (14) can be then passed through valve V1 and returned back to the hypertonic solution side of the concentration module (15) and the process can be repeated. The process described herein can be implemented to work with all commercially available desalination systems.

The feed (2) can be concentrated as it passes through the waste side of the concentration module (3) and comes in contact with the semi-permeable barrier. This concentrated feed exits the concentration module as a brine byproduct discharge (4). The flow rate of the feed from (1) to (4) determines the recovery ratio of the system and the concentration of brine in the byproduct (4). The total system recovery ratio can be defined as the flow rate of the product (13) divided by the flow of water in the feed (1). In some embodiments the flow rate from (1) to (3) can be increased to a level that the change in the solute concentration in the byproduct can be minimized without drastically affecting specific power consumption.

The hypertonic solution flow rate (6) to (15) can likewise be optimized to minimize power consumption by increasing the solute content of the hypertonic solution and reducing the flow rate. The maximum recovery rate of the hypertonic desalination element (12) can be set by the precipitation threshold of the hypertonic solution at (14) and the dilution factor at the exit to the concentration module (6). The hypertonic desalination element water recovery ratio can be defined as the flow rate of the product (13) over the water content flow of the hypertonic solution at (11).

Figure 5:
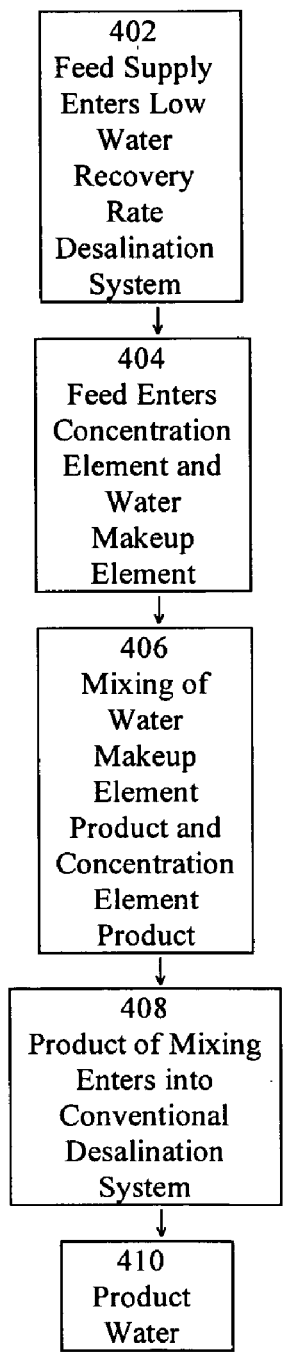
FIG. 5 depicts the flow of product water through the embodiment shown in FIG. 1

The embodiment in FIG. 5 depicts the flow of product water through the embodiment shown in FIG. 1.

Feed water (21) can be pumped into the concentration element (22). The feed water passes through the concentration element where it contacts a semi-permeable barrier. A small portion of this feed water can diffuse across this barrier and can mix with a recirculating hypertonic solution. A small slipstream from the feed can then be mixed with the hypertonic solution to replace any lost solutes (23). The hypertonic solution can be then pumped through a conventional desalination system (24). In the desalination system the water in the hypertonic solution is removed and becomes the product.

EXAMPLE CASES

The following examples provide specifications for designs using two different seawater desalination systems. They are provided only as examples. While these examples depict two types of conventional desalination systems any conventional desalination system can be used.

Example 1

This example illustrates the use of some embodiments with a distillation system operating as the desalination system (12) in FIG. 1. It can be applicable to various forms of distillation such as vapor compression distillation, multi-stage flash, and multiple effect distillation. The example illustrates the use of some embodiments for the desalination of seawater. The process can be the same as that shown in FIG. 1 with the exception that a recuperative heat exchanger can be placed between 11 and 14. The specifications are provided in Tables 1 & 2. While this embodiment depicts the use of distillation as the desalination system, any desalination system may be used.

TABLE 1

Concentration module element specifications for seawater desalination

Hypertonic solution = seawater
Feed pressure (P1) = 7-14 kPa
Max temperature (15) = 343 K
Hypertonic solution inlet concentration (15) = 5 to 15% (m)
Hypertonic solution outlet concentration (6) = >3.5% (m)
Seawater inlet concentration (1) = 3.5% m
Seawater outlet concentration (4) = >3.5%
Permeate rate = 10-25 LMH
Fluid velocities = 0.1-1 m/s
Hypertonic salt loss = 0.07% g/kg product
Seawater makeup flow rate = 0.02 g seawater/Kg of product water

TABLE 2

Distillation specifications for seawater desalination

Pressure (P2) = 7-14 kPa
Separation = 8.5 to 11.5%
Total Dissolved solids in product = <10 mg/L
Specific Heat Transfer Rate = 200-300 $m^2$/(kg/s)

Example 2

This example describes the use of some embodiments with an electrodialysis system, such as described in U.S. Pat. No. 4,787,982, operating as the desalination system (12) in FIG. 1. It can be applicable to various forms of electrodialysis such as multi stage, and flow reversal systems. The example illustrates the use of some embodiments for the desalination of seawater. The process can be the same as that shown in FIG. 1. The specifications are provided in Table 1 & 3. While this embodiment depicts the use of electrodialysis as the desalination system, any desalination system may be used.

TABLE 3

ED specifications for seawater desalination

Pressure (P2) = 30 kPa
Separation = 8.5 to 11.5%
Product flow rate = 7 LMH
Total dissolved solids, product = <500 mg/L

What is claimed is:
1. A system comprising:
a concentration element capable of concentrating a feed by extracting solvents across a semi-permeable hydrophilic barrier into a re-circulating hypertonic solution that is composed of the same solutes as exist in said feed but at a slightly higher concentration and which allows solutes to leak backward from the hypertonic solution across the semi-permeable barrier into the feed at a controlled rate; a semi-permeable barrier that is contained in said concentration element and is selected to control the backward flux of solutes in order to improve the forward flux of solvent: a water makeup element capable of receiving a slipstream from said feed and adding said slipstream to said hypertonic solution to make up the solutes needed in said re-circulating hypertonic solution that are lost back across said semi-permeable membrane of said concentration module: a desalination system that removes water from said hypertonic solution and re-concentrates said hypertonic solution; and a system for transporting said re-circulating hypertonic solution coupled with said concentration module, said desalination system, and said water makeup element and wherein said make up element removes suspended solids and scale forming ions from said slipstream.

2. The system of claim 1 further comprising: a desalination system; wherein purified water is produced by passing said re-circulating hypertonic solution through said desalination system.

3. The system of claim 1, wherein the concentration element allows the flux of solutes in the concentrated hypertonic solution to move backwards into the feed, through the semi-permeable membrane of the concentration element, at a rate that is selected to adjust the forward flux of solvent across the semi-permeable membrane.

4. The system of claim 1, wherein the system is operated at a low water recovery ratio in order to minimize the flux of solutes back across the semi-permeable membrane in the concentration element and the environmental impact of its operation.

5. The system of claim 4, wherein said feed to said concentration module is not pressurized above the osmotic pressure of the feed.

6. The system of claim 1 wherein said water makeup element adds chemicals to said slipstream and thereby also to said re-circulating hypertonic solution in order to control biological and chemical factors in the re-circulating hypertonic solution.

7. The system of claim 1 wherein said water makeup element adds anti-scale chemicals to said slip stream and thereby also to said re-circulating hypertonic solution to extended membrane life by reducing scale formation.

8. The system of claim 1, wherein a water recovery ratio associated with a desalination system can be set independently of a total system recovery rate by increasing or decreasing the flow of said hypertonic solution through said desalination system.

9. The system of claim 1, wherein scale formation from said feed to the concentration module is minimized by operation of said concentration module at a low water recovery rate by maintaining high flow rates of said feed with respect to said hypertonic solution or by submerging said concentrator element in said body of feed solution.

10. The system of claim 1, wherein said semi-permeable barrier is selected to increase the forward osmotic flow of solvent by allowing the reveres flux of solutes.

11. The system of claim 1, wherein said re-circulating hypertonic solution is maintained at conditions that prevent growth of biological contaminates by injecting acid into said slipstream from said water makeup element in order to reduce said hypertonic solution's pH to as low as 2.

12. The system of claim 1, wherein said feed is at least one of seawater, brackish water, a suspension of at least one biological agent in water and industrial process water.

13. A method comprising:
receiving feed solution;
separating said feed solution into a concentrator feed and a slipstream;
processing said concentrator in a concentration element feed to remove solvent and transport said solvent into a hypertonic solution;
processing said hypertonic solution in a desalination system in order to produce purified water and a re-circulating concentrated hypertonic solution;
returning said re-circulating concentrated hypertonic solution to the concentrator;
processing said slipstream, which is taken from said feed solution, and adding it to said hypertonic solution in order to provide solutes to makeup for those lost through reverse flux in the concentrator wherein the sleep stream taken from the feed solution is a make up slipstream, and the processing includes removing suspended solids and scale forming ions from said slipstream.

14. The method of claim 13 further comprising:
delivering said re-circulating hypertonic solution to said concentrator element at conditions of flow, temperature, and pressure that enhance the performance of said concentrator module.

15. The method of claim 13 further comprising:
Keeping the concentration of solutes in said hypertonic solution low, only slightly above the solute concentration of said feed, in order to reduce the reverse flux of solutes back across the semi-permeable membrane in the concentrator element and producing said purified water at a low water recover rate.

16. The method of claim 13 wherein said ions are calcium, silica, magnesium and iron calcium, silica, magnesium, and iron in said slipstream.

17. The method of claim 13 further comprising: processing said slipstream to add new solutes to said slipstream.

18. The method of claim 17 further comprising:
adding, chemicals to said re-circulating hypertonic solution to maintain extremely high levels of anti-scale compounds and a pH as low as 2 in order improve performance and membrane life by reducing scaling, solids formation, and biological growth in the re-circulating hypertonic solution.

19. The method of claim 13 further comprising:
returning said re-circulating hypertonic stream from said desalination system to said concentration element to remove additional solvent front the feed stream.

* * * * *